(12) United States Patent
Lee et al.

(10) Patent No.: US 11,028,600 B1
(45) Date of Patent: Jun. 8, 2021

(54) COMBINATION TOOL HAVING VARIOUSLY CONFIGURED IMPLEMENTS FOR SPREADING MATERIALS

(71) Applicant: PATENT & INVESTMENT LLC, Jessup, MD (US)

(72) Inventors: Albert Lee, Clarksville, MD (US); Tyler Hippen, Marriottsville, MD (US); Brian Glass, West Friendship, MD (US)

(73) Assignee: Patent & Investment LLC, Jessup, MD (US)

(*) Notice: Subject to any disclaimer, the term of this patent is extended or adjusted under 35 U.S.C. 154(b) by 117 days.

(21) Appl. No.: 16/389,725

(22) Filed: Apr. 19, 2019

Related U.S. Application Data

(63) Continuation-in-part of application No. 29/643,456, filed on Apr. 9, 2018, now Pat. No. Des. 892,591.

(60) Provisional application No. 62/659,836, filed on Apr. 19, 2018.

(51) Int. Cl.
| | |
|---|---|
| *B25G 1/08* | (2006.01) |
| *E04F 21/00* | (2006.01) |
| *B25G 3/38* | (2006.01) |
| *B44D 3/16* | (2006.01) |

(52) U.S. Cl.
CPC ............ *E04F 21/0084* (2013.01); *B25G 1/08* (2013.01); *B25G 3/38* (2013.01); *B44D 3/16* (2013.01)

(58) Field of Classification Search
CPC ............................... B44D 3/16; E04F 21/0084
See application file for complete search history.

(56) References Cited

U.S. PATENT DOCUMENTS

| | | |
|---|---|---|
| 63,102 A | 3/1867 | Russ |
| 867,011 A | 9/1907 | Bromley |
| 987,703 A | 3/1911 | Curtin |
| 1,000,333 A | 8/1911 | Hall |
| 1,264,430 A | 4/1918 | Ossman |
| D145,685 S | 10/1946 | Chandler et al. |
| 2,498,171 A | 2/1950 | Michler |
| D213,388 S | 2/1969 | Hopcraft |
| 3,761,992 A | 10/1973 | Schneller |
| 4,124,939 A * | 11/1978 | Onoue ...................... B26B 1/02 30/161 |
| 4,350,445 A | 9/1982 | Olsson |

(Continued)

*Primary Examiner* — Michael D Jennings
(74) *Attorney, Agent, or Firm* — Rosenberg, Klein & Lee

(57) ABSTRACT

A combination tool apparatus selectively stows and deploys a plurality of variously configured implements for spreading materials. A housing defines a coupling end portion and includes first and second plate members extending longitudinally from the coupling end portion to define a stowage compartment therebetween. A blade set includes a plurality of blade members respectively defining spreading portions of various configuration. Each of the blade members is angularly displaceable between stowed and deployed positions with respect to the housing. When stowed, each blade member is disposed substantially within the stowage compartment of the housing. When deployed, each blade member has at least a portion extending outward from the stowage compartment. A coupling member disposed at the coupling end portion of the housing is pivotally coupled to the blade members for angular displacement thereabout between the stowed and deployed positions. The blade members are biased to remain in the stowed position.

20 Claims, 14 Drawing Sheets

(56) References Cited

U.S. PATENT DOCUMENTS

| | | | |
|---|---|---|---|
| 4,498,239 A * | 2/1985 | Epstein | G01B 3/32 |
| | | | 33/567 |
| 4,536,910 A | 8/1985 | Clark | |
| 4,567,616 A | 2/1986 | Lyons | |
| 4,919,604 A | 4/1990 | Wilson | |
| 5,239,725 A | 8/1993 | White | |
| 5,887,347 A * | 3/1999 | Gibbs | B26B 1/042 |
| | | | 30/155 |
| 6,279,241 B1 * | 8/2001 | Chen | G01B 3/30 |
| | | | 33/199 R |
| 6,293,020 B1 | 9/2001 | Julien | |
| D481,269 S | 10/2003 | Siegel et al. | |
| D488,033 S | 4/2004 | Overthun et al. | |
| 6,735,840 B2 | 5/2004 | Gibbs | |
| D496,230 S | 9/2004 | Germany | |
| D496,231 S | 9/2004 | Germany | |
| 6,813,842 B2 | 11/2004 | Wang | |
| 9,790,692 B2 | 10/2017 | Bernicke-Grussing et al. | |
| 10,343,449 B2 * | 7/2019 | Levand | B44D 3/164 |
| 2004/0200084 A1 * | 10/2004 | Wang | G01B 3/50 |
| | | | 33/501.45 |
| 2006/0257513 A1 | 11/2006 | MacLeod | |
| 2007/0271795 A1 * | 11/2007 | Brandon | B26B 11/001 |
| | | | 30/152 |
| 2014/0047718 A1 * | 2/2014 | Fellows | B26B 1/04 |
| | | | 30/161 |
| 2014/0109418 A1 * | 4/2014 | Wu | G01B 21/08 |
| | | | 33/501.6 |

* cited by examiner

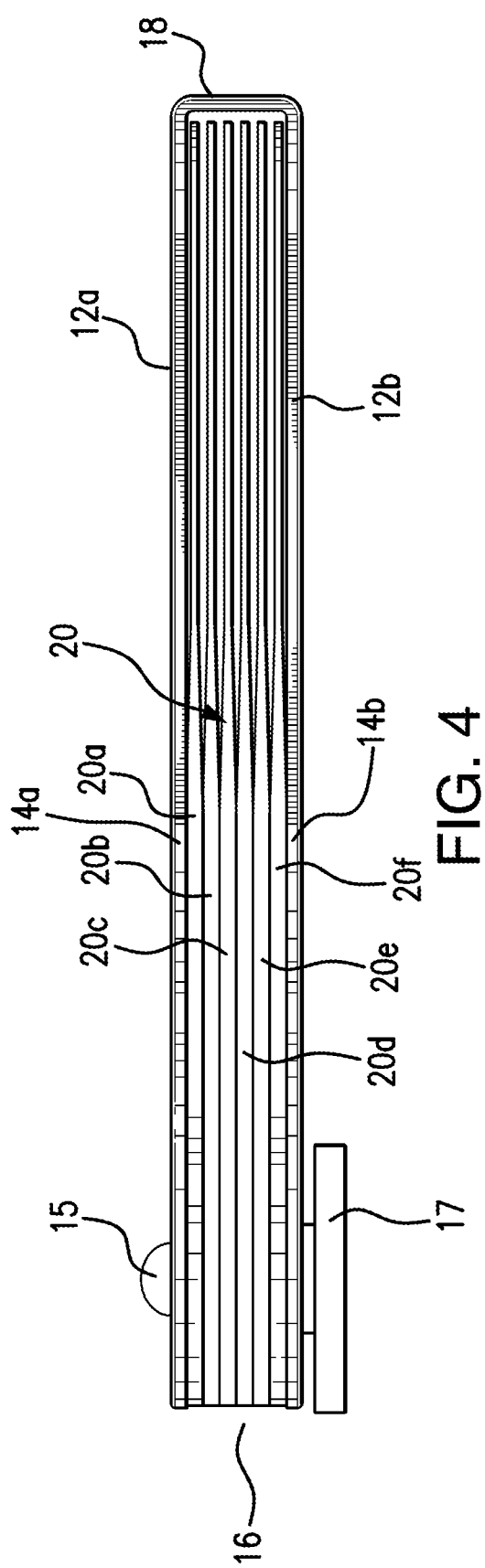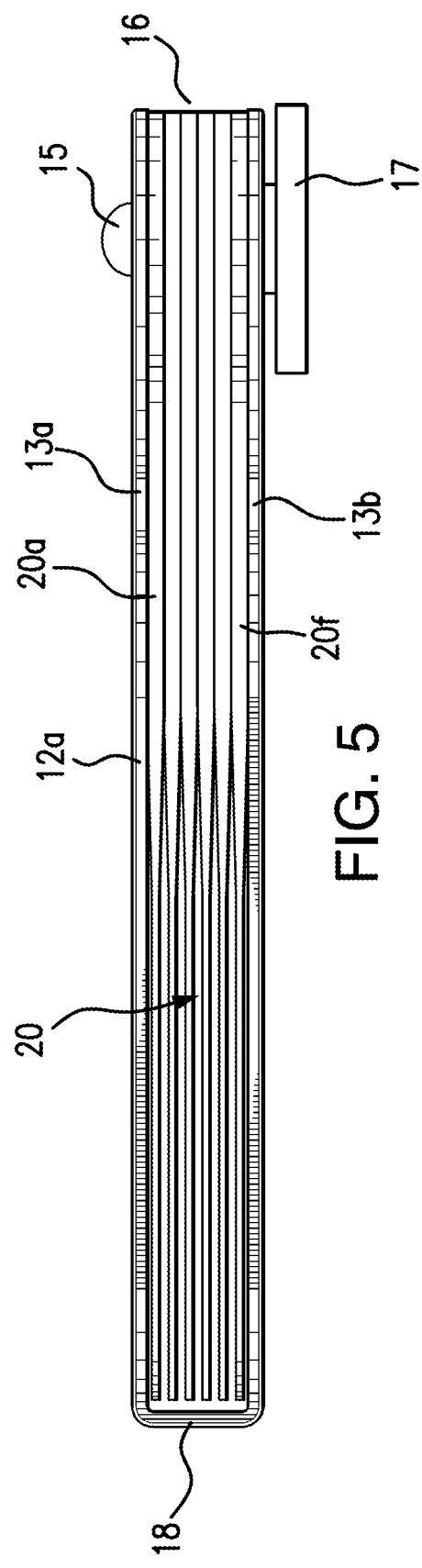
FIG. 4
FIG. 5

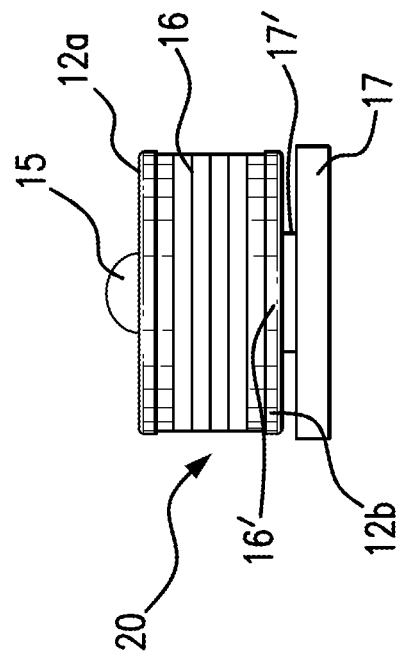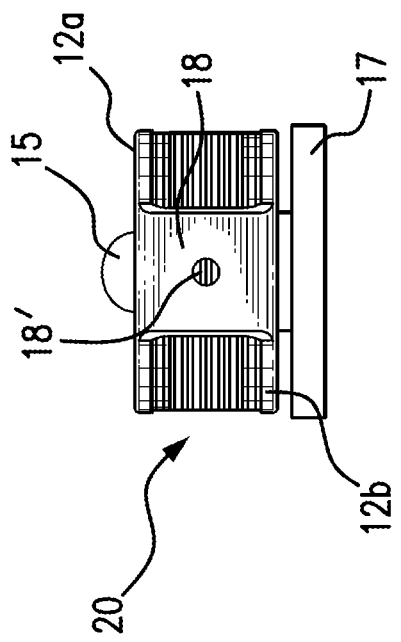

COMBINATION TOOL HAVING VARIOUSLY CONFIGURED IMPLEMENTS FOR SPREADING MATERIALS

RELATED APPLICATION DATA

This Application is based on Provisional Patent Application No. 62/659,836, filed 19 Apr. 2018. This Application is a Continuation-In-Part of co-pending application Ser. No. 29/643,456, filed 9 Apr. 2018.

BACKGROUND OF THE INVENTION

The present invention is generally directed to a combination tool having variously configured implements for spreading out and neatly smoothing pasty or other such spreadable materials. Among the problems that are addressed is that there are numerous spatula-like products on the market for use in building and construction, manufacturing, or other such applications. Usually, these known products are subject to many problems and shortcomings in practice. For example, various sizes and configurations of implements may be needed for a particular job or project, and the user must procure all the different the tools/implements which are typically available separately and loosely in all different sizes and configurations. Heretofore, the typical solution in such cases was to obtain individual spreading devices that would connect by a keyring, for instance, to cluster a set of devices together. But even then, the devices would remain essentially loose structurally but for a common link. Many would tend to cut the keyring, or distributors of devices would even cut a pre-installed keyring to free the devices ('spatulas') for individual sale and use. A sufficiently full set of devices clustered this way would typically be rather clunky and difficult to carry in many cases.

Often when a user loosens them by disconnection or disassembly, there is obvious risk of displacing and losing particular individually sized spatulas. With the subject combination tool, one may conveniently carry and store the tool easily. The individual implements are conveniently housed and securely retained yet easily deployed for use, such that one would not misplace individually sized and configured implements apart from the rest.

Regarding the spatula like device, a grouping of differently sized and/or configured (perhaps even of different shape and/or length, material, stiffness, or the like) may be provided for individual spatula devices to be deployed for use. Each spatula device is used in the industry for pressing materials into cracks, joints and spaces. For instance, if one were a glass glazer who installs windows, or a worker needing to insert a malleable material like silicone into given joints, one would extend the appropriately sized and configured spatula device individually from the handle/housing for selective use. In the case of a concrete joint or expansion joint, for example, the user would insert between concrete slabs a backer rod, which is typically formed as a rounded strip of foam or the like, then on top of and around that apply a sealant material. As the concrete slabs tend to move due to joint expansion and contraction with vibration or variations in temperature, the sealant serves to keep the joint movable or flexible like this while remaining substantially filled and without compromise. To serve this function reliably, the sealant must be sufficiently pressed into the joint, conforming closely up against and around the backer rod and into the substrate (to fill gaps in between). The deployed spatula is used to push the sealant material into the joint and smooth it out.

These are just two of the numerous applications for use of variously configured spatula devices. Typically, when a worker is using an industrial dispenser for extrusive dispensing of a caulk or other such pasty material onto such a joint, once they apply the material, they then smooth it out with some sort of spatula device, or in the absence of any device, simply with a finger. This is to not only make for neat and finished appearance, but also to just make sure the material gets well into the space/joint/gap, and that it forms an effective seal.

Also, workers would typically use multiple differently sized and multiple differently configured spatulas for the smoothing task, depending on the size and shape of the given joint to be worked on. Often, the expected range of actual joint widths may be reasonably estimated to be at or about certain standard widths according to applicable specifications. But the actual joint sizes encountered in the field may range widely in actual practice, for example from just under an inch to just over an inch. Actual joint sizes, in particular, are not very consistent, and the worker needs to have an arsenal of the spatula blade sizes at their disposal, in order to adequately do the job. In the context of windows, for instance, one window might have a glaze gap of a half inch, while other windows in the same building might have glaze gaps that are considerably greater or less than that.

There is therefore a need for a simple yet easily operable combination tool apparatus that provides a plurality of selectable alternatives for spatula-like spreading blade configurations to suit any of a plurality of construction, manufacturing, or other situations encountered in the field where an extrusively dispensed material is worked with. There is a need for such combination tool apparatus which provides the differently configured blade members in a neatly and securely stowed manner within a portable housing until the user is ready to make use of one or more of the blade members, and which at that time provides for convenient independent deployment of each individual blade member to a firm and stable deployed position extending from the housing. There is a need for such tool apparatus which is versatile enough in available configurations, and readily reconfigurable between the configurations, to adaptively meet the needs of a wide range of different work situations and conditions.

BRIEF DESCRIPTION OF THE DRAWINGS

FIGS. 1-11A are various plan, elevation, perspective, and exploded views of an apparatus formed in accordance with one exemplary embodiment of the present invention;

SUMMARY OF THE INVENTION

Figure 1:
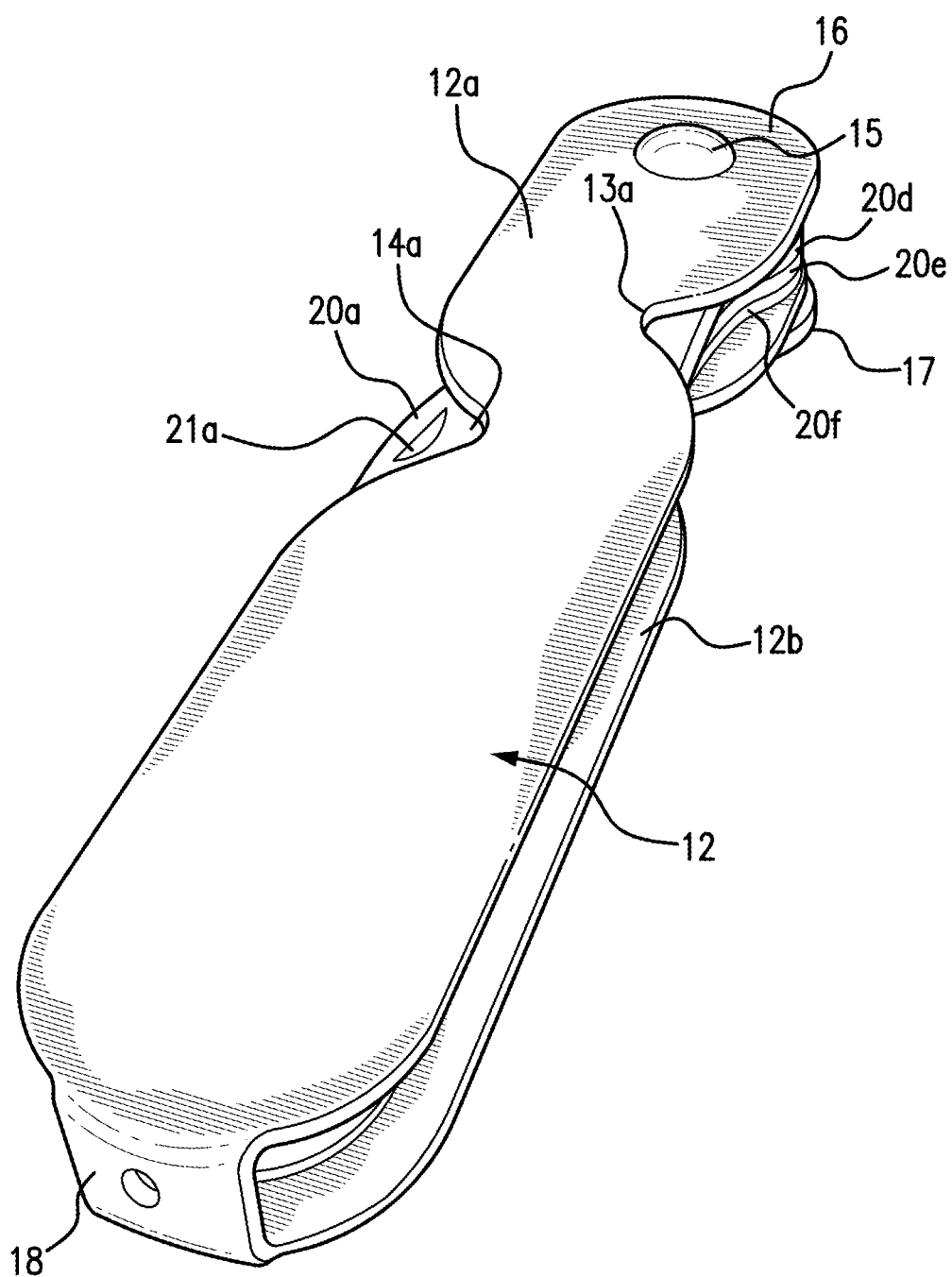

It is an object of the present invention to provide a combination tool apparatus that is simple yet easily operable to provide a plurality of selectable alternatives for spatula-like spreading blade configurations to suit various applications.

It is another object of the present invention to provide a combination tool apparatus which provides differently configured blade members in a neatly and securely stowed manner within a portable housing until the user is ready to make use of one or more of the blade members.

It is yet another object of the present invention to provide a combination tool apparatus which at that time of use provides for convenient deployment of each individual blade member to a firm and stable deployed position extending from the housing.

These and other objects are attained in a combination tool apparatus for selectively stowing and deploying a plurality of variously configured implements for spreading materials. The apparatus comprises a housing defining a coupling end portion and including first and second plate members extending longitudinally from the coupling end portion to defining a stowage compartment therebetween. A blade set includes a plurality of blade members each defining a spreading portion, with the spreading portions of different blade members being variously configured relative to one another. Each of the blade members is angularly displaceable between stowed and deployed positions with respect to the housing, and each blade member in the stowed position is disposed substantially within the stowage compartment of the housing, and in the deployed position has at least a portion thereof extending outward from the stowage compartment. A coupling member is disposed at the coupling end portion of the housing to pivotally couple the blade members for angular displacement thereabout between the stowed and deployed positions, wherein the blade members are biased to remain in the stowed position.

In certain though not necessarily all embodiments, the first and second plate members of the combination tool apparatus extend longitudinally from the coupling end portion to a bridging end portion, with the first and second plate members being coupled together by a bridge member extending transversely to span the stowage compartment therebetween. In certain though not necessarily all embodiments, the coupling member of the combination tool apparatus is removably passed through the first and second housing plate members and the blade set is disposed therebetween, the coupling member including a head portion engaging the first housing plate member and a pivot shaft extending axially beyond the second housing plate member. In certain though not necessarily all embodiments, combination tool apparatus further comprises a locking member releasably engaging a terminal end of the pivot shaft to capture the blade set between the first and second housing plate members in adjustable force fit manner.

In certain though not necessarily all embodiments, the coupling member of the combination tool apparatus engages the coupling end portion of the housing to pivotally intercouple the blade members. The first housing plate member in such embodiments is formed with a keyed opening at the coupling end portion. The coupling member includes a keyed protrusion adjacent to the head portion, the pivot shaft extending axially from the keyed protrusion, with the keyed protrusion engaging the keyed opening to lock the coupling member against angular displacement relative to the first housing plate member. The coupling member also includes a threaded portion extending along at least a part of the pivot shaft to the terminal end thereof.

DETAILED DESCRIPTION OF THE PREFERRED EMBODIMENTS

In accordance with certain aspects of the present invention, a combination tool apparatus provides a set of individually selectable spatula like blade members that may be stowed in or deployed from a housing for use as needed. Each individual spatula device/blade member may be formed of any suitable material known in the art such as metal, plastic, or any other material of sufficient strength, rigidity, chemical resistance, and/or of other material properties and characteristics required for the intended application. For instance, spatula device blades of stainless steel are employed in the illustrated embodiment, but may be formed of other materials in certain other embodiments and applications. The group of spatulas provided for the combination tool are preferably of similar or even equal length, though with different widths and in certain cases of different thickness and flexibility profiles.

In certain applications, deployable blades of consistent length provide a notable benefit. There may be an optimal consistent length for the set of grouped spatula blades provided in the tool, but such would depend on the particular requirements of the intended application. In the exemplary embodiment illustrated a length within approximately 5-6 inches or more suits a wide spectrum of different applications across construction and manufacturing related settings. For different applications, the lengths and configurations, as well as the number, of deployable blades may be varied as needed. Preferably, the blades of substantially uniform length are provided in a combination tool to remain within a suitable approximate range of blade lengths. This enables other aspects of the individual blades to be varied, so as to yield an optimal or near optimal blend of individual blade characteristics. For example, keeping the blades at the same or similar lengths while varying their thicknesses (or thicknesses at certain portions thereof) enable the flexibility and overall tool weight and bulk of the tool to be optimized when providing a given number of blade choices. There is no typical or optimum flexibility or thickness profiles for the given set of blades, as that is determined as much by personal preference as it is by the operational requirements of particularly intended applications. Different versions of the tool, for example, may provide respective blade sets having comparatively similar dimensional and shape configurations yet with one set being generally less flexible than the other set.

In the various embodiments shown, six individual blades of differing width are employed in the illustrated set of blades. The blades are stowed within the housing which serves also as a convenient, stable handle. As noted, the number and relative configurations of individual blades may be suitably varied for other embodiments and applications. The sample set of blade sizes provided in the illustrative embodiment preferably covers a wide range of material fill space sizes typically encountered in the range of applications contemplated. Within a particular joint fill context, for instance, the set of blades provided by the disclosed embodiments may cover about 80 percent of the different joint sizes normally encountered in different known applications. But there may be a trend currently towards joint sizes encountered that are larger than the widest blade in the illustrated embodiment's set (about 1% inch). So inclusion of a wider blade may be warranted, as an example, should such larger joint sizes be encountered with sufficiently more regularity in the art.

Referring now to the FIGS. 1-11A, there is shown a combination tool apparatus 10 formed in accordance with one exemplary embodiment of the present invention. In the various views shown in these FIGS., and in the other FIGS. 12-15, like features are denoted by like reference numbers/ characters. The views of FIGS. 1-11A illustrate one of numerous embodiments of the subject combination tool.

In s similar but slightly modified embodiment, certain adjustable locking measures employed in the illustrated embodiment may be replaced with simpler measures. For example, the rotatable dial fastener which adjustably and pivotally secures a given set of blades to the housing may be replaced by more permanently installed measures for pivotal coupling with a fixed coupling tension. As a further example, the blades employed in the illustrated embodiment are equipped with gripping notches. These gripping notches may be arranged differently on certain individual blades.

The combination tool apparatus 10 in this embodiment generally includes a housing 12 that serves both as a semi-enclosure for a set (or grouping) of blades 20 made up of individually deployable spatula blades 20a-20f, and as a handle for the user. The housing 12 is formed with a top plate member 12a and a bottom plate member 12b whose intermediate portions are spaced apart to define a blade storage chamber therebetween. The top and bottom plate members 12a, 12b are joined together preferably through at least one end, namely a coupling end 16, but preferably also at another opposing end, by a bracket-like bridge 18. The bridge 18 is preferably (though not necessarily) integrally formed with corresponding ends of the plate members 12a, 12f to extend transversely therebetween.

The blade set 20 is disposed in the blade storage chamber when the apparatus is disposed in the fully stowed configuration shown in FIGS. 1-7. In this embodiment, the blade set 20 is formed by six individually extendable blades 20a-20f, preferably of progressively varied blade width and/or flexibility. The blades 20a-20f are preferably of substantially uniform predetermined length, and each extends longitudinally from a coupling end to a free end. The blades are stacked over top of one another when stowed in the bladed storage chamber. The blades' coupling ends remain stacked, with adjacent blades at least partially disposed relative to one another in slidable planar engagement for selective pivotal displacement of each individual blade relative to the others.

The housing 12 effectively forms a convenient handle by which a user may securely and comfortably grip the apparatus 10. The top and bottom designations for the housing's plate members 12a, 12b are somewhat arbitrarily applied, and used herein simply for mutual relative referencing purposes. Such relative designations do not necessarily require any particular orientation of the apparatus 10 when in use or when stowed away.

The housing 12 (and of each of its plate members 12a, 12b) extends longitudinally between two opposed end portions, namely, a coupling/pivoting end 16 and a bridging end 18. When one or more blades are deployed by pivotal rotation to swing out to a longitudinally extended position out from the housing 12, the coupling end 16 serves as a front of the housing 12 during use, while the opposite bridging end 18 serves as a rear of the housing 12 during use. The bridge end 18 is formed in this embodiment as a bracket that secures and separates the two plate members 12a, 12b. The free ends of the blades 20a-20f are disposed adjacent this bridging end portion 18 when stowed in the blade storage chamber. The pivoting end 16 is where suitable pivotal coupling measures are employed to define a shaft about which each of the blades 20a-20f is aligned and retentively secured.

Figure 10:
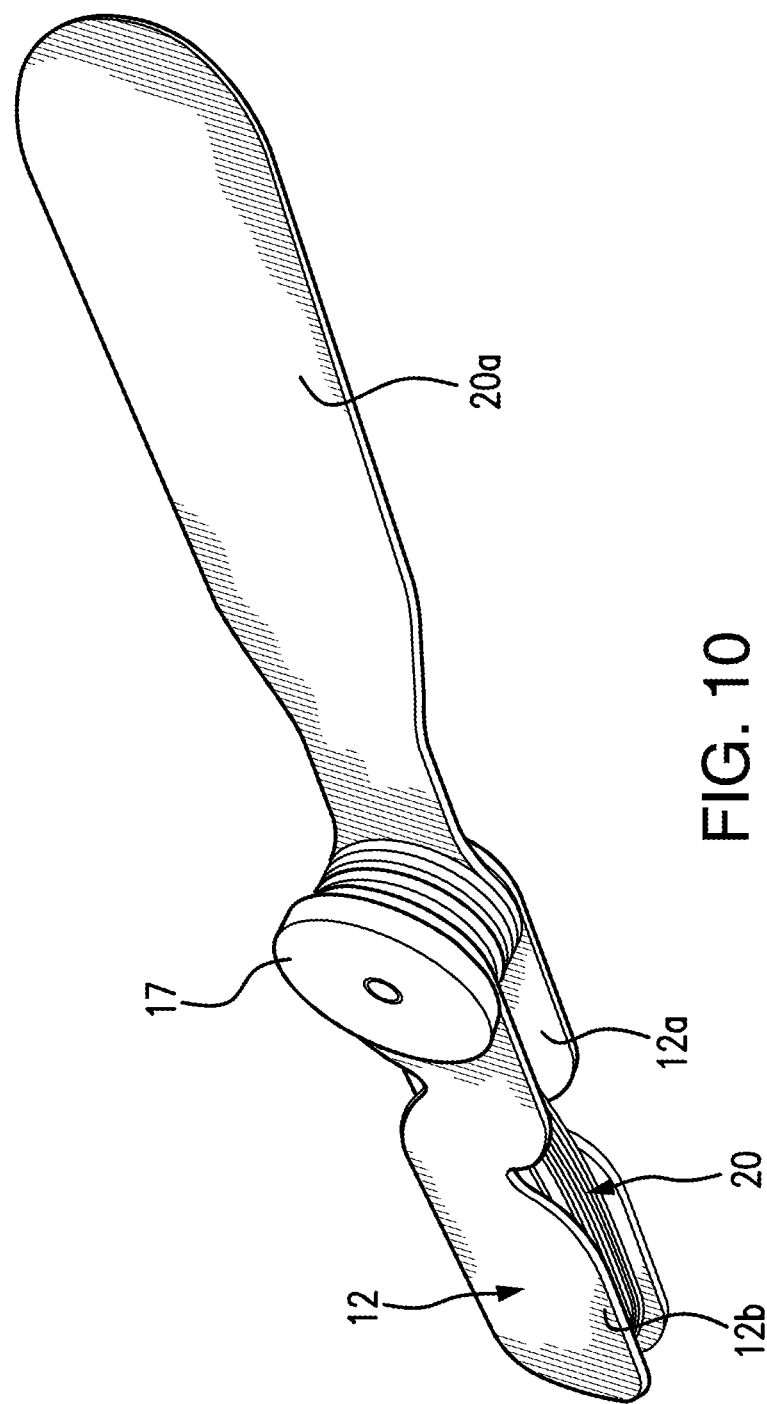
Figure 11:
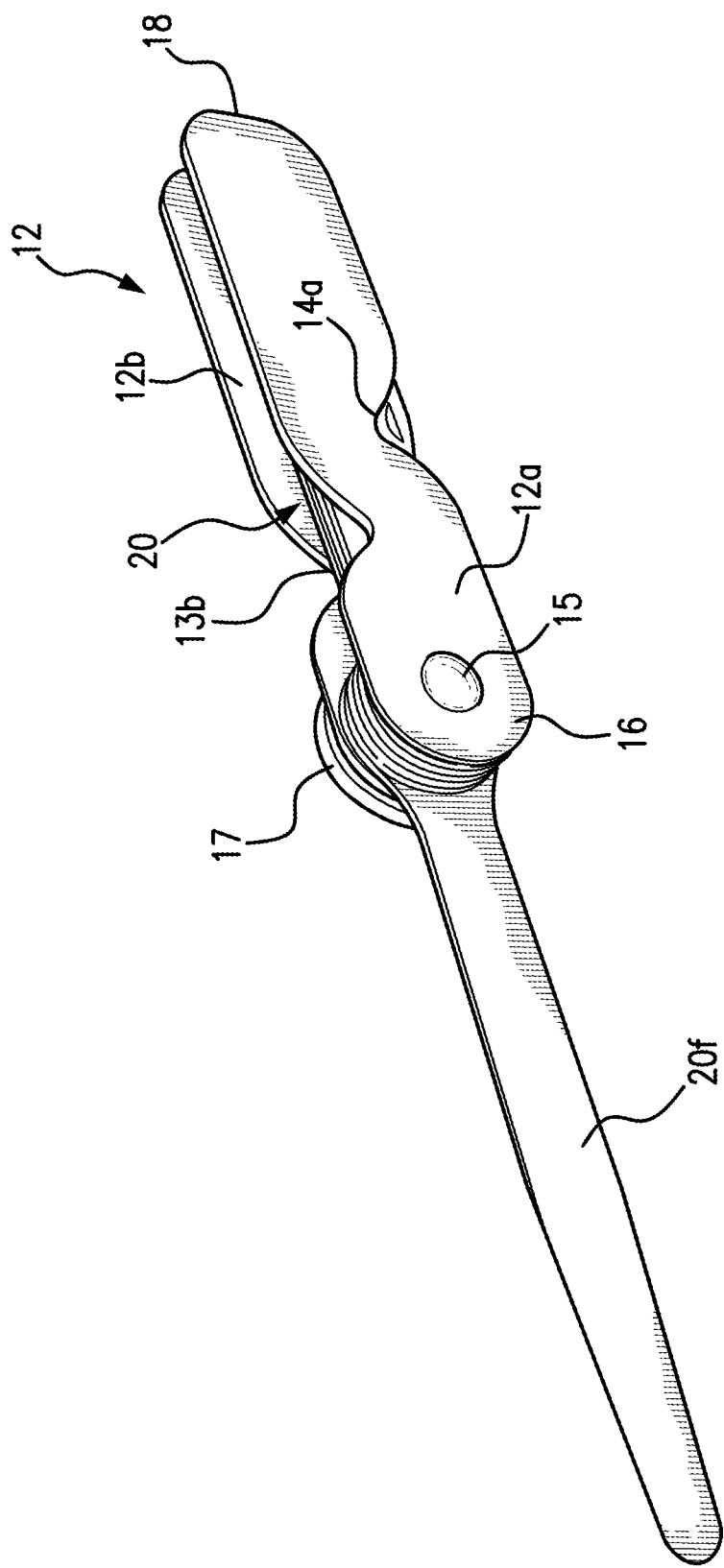
Figure 11A:
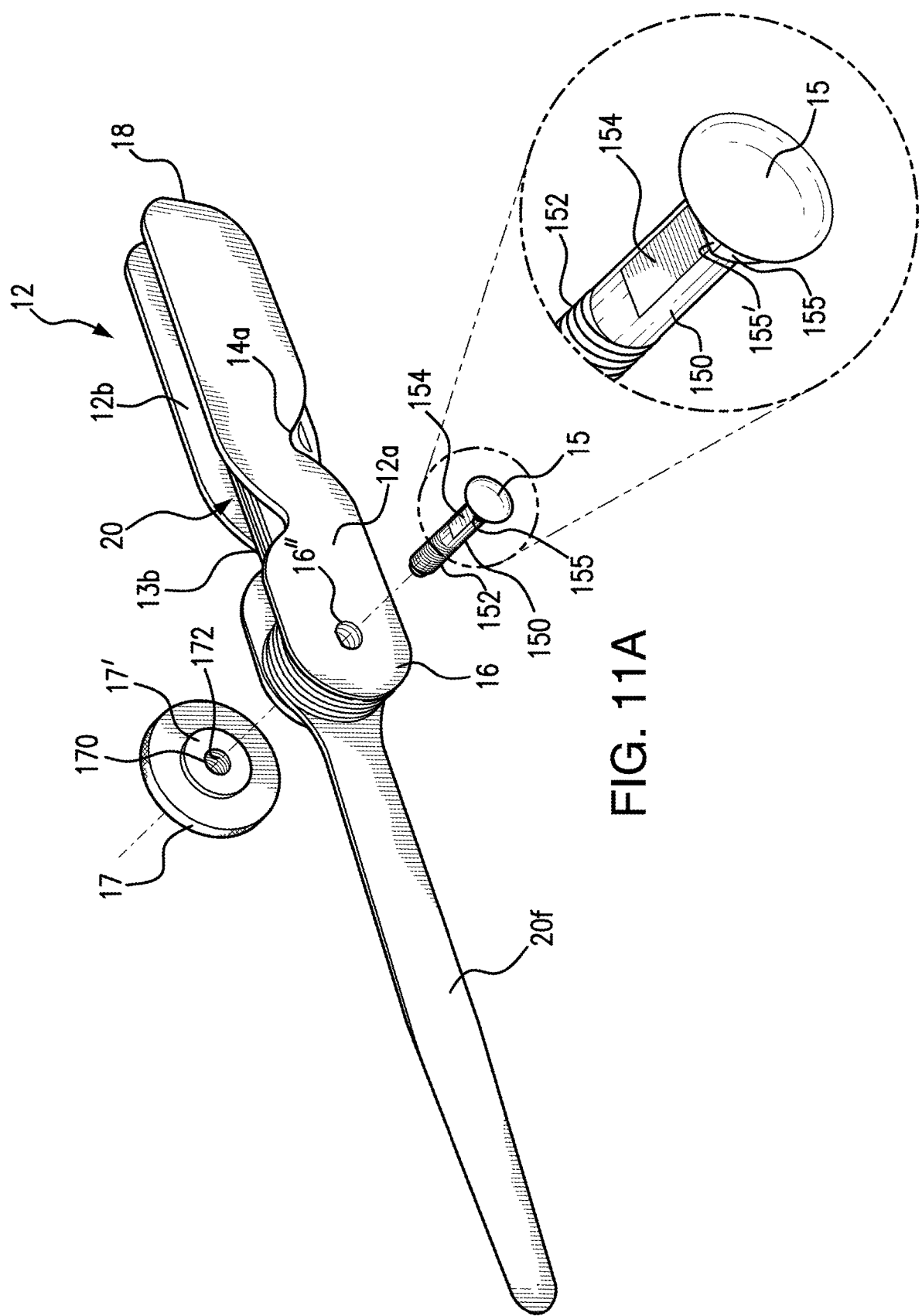

The apparatus 10 further includes a coupling member 15 that serves much as a spindle or pivot axle for the stacked blade members 20a-20f, which respectively define variously configured spatula or spreading element portions. The coupling member 15 includes a pivot shaft that passes through the coaxially stacked coupling ends of the blades 20a-20f, such that each individual blade may be angularly and independently displaced outward from the housing 12 when selected for use. To allow for ease of access to each of the blades 20a-20f, access points 13a, 14a (on the plate member 12a) and 13b, 14b (on the opposing plate member 12b) formed in this embodiment as grooves in the peripheral contours of the housing plate members 12a, 12b. Each of the blade members/elements 20a-20f in this embodiment is preferably provided with a gripping feature, such as a finger nail notch 21a-21f cut into a suitable point along the blade to align with one of the access points 13a, 13b, 14a, 14b, whereby the user may more easily grip and pull or push the desired blade 20a-20f from the stowed to extended/deployed position (such as shown in FIGS. 10-11A). When extending any of the blades 20a-20f out for deployment, one access point may be used to grip and lift using that blade's finger nail notch 21a-21f, while the other access point is used to help push the other opposing edge of that blade (to the extent that it is exposed through that other access point) out of the housing 12.

Turning to the individual blade elements 20a-20f, they are illustrated in this particular embodiment stacked from the broadest to the narrowest blade element. This is but one of numerous examples of the stacked arrangement, and the blades may be suitably varied in configuration, stacking arrangement, orientation relative to the housing, or the like depending on the requirements of the particularly intended application. Preferably, the blades are frictionally or otherwise biased by suitable measures known in the art to remain in the stowed position, and when deployed to remain in the deployed position. In the example shown, the blades' configurations and arrangement are such that the bottom-most blade 20f happens to be the thinnest and narrowest of the stacked blades, and the top-most blade 20a happens to be the widest and thickest. Again, this relative top-to-bottom stacked arrangement and ordering may be varied as needed or desired to suit the intended application.

The pivotally displaceable stacking of the blades 20a-20f is releasably and adjustably secured by a dial or wheel-like lock member 17 which engages the bottom end of the coupling member 15. The locking wheel member 17 may be formed with any other contour and structural configuration in alternate embodiments, but it serves as an easily adjustable member which when rotated in one direction relative to the coupling member 15 tightens the coupling and when rotated in the other direction loosens the coupling. That is, the stacked blades 20a-20f, is captured between the housing plate members 12a, 12b in adjustable force fit manner by the adjustably tightened engagement between coupling and locking members 15 and 17. The blades 20a-20f are thereby held against one another in their stacked arrangement with a variable degree of tightness, adjustably held against loose and uncontrolled movement by the degree of resulting friction between adjoining surfaces thereof.

Preferably, the coupling and locking members 15 and 17 are threadedly engaged to one another. Thus, when the locking member 17 is loosened by turning to unscrew relative to the coupling member 15, the captive force of the blade stack is lessened, and the individual blades 20a-20f are loosened from one another. The frictional force between adjoining blades is thereby reduced, and each individual blade may then be angularly displaced relative to the other blades more easily. Then once a selected blade is fully extended out of the housing 12 for use, the locking member 17 may once again be re-tightened to secure against inadvertent displacement of the deployed blade or any of the other stowed blades relative to the housing 12. Alternatively, the locking member 17 may be set to maintain a certain optimal tension in the blade set's stacked intercoupling, such that the blades are held in place (when in either the stowed or deployed positions) by a suitable degree of frictional force which may be overcome by a reasonable level of pulling/pushing force by the user to place individual blades in or out of their deployed/stowed positions relative to the housing 12.

Figure 2:
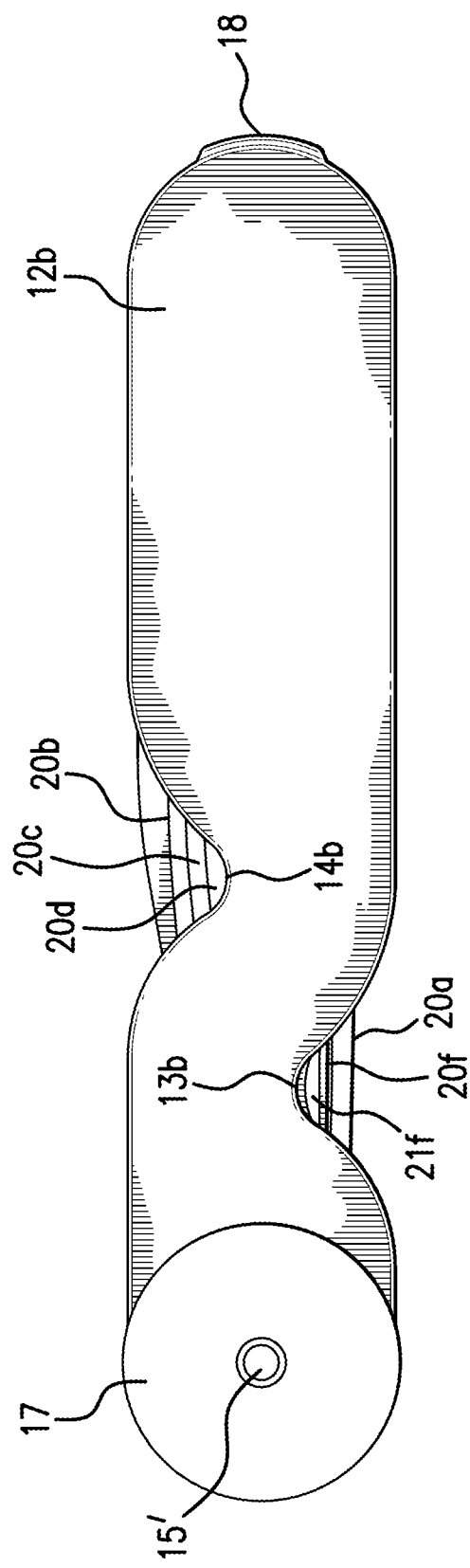
Figure 2A:
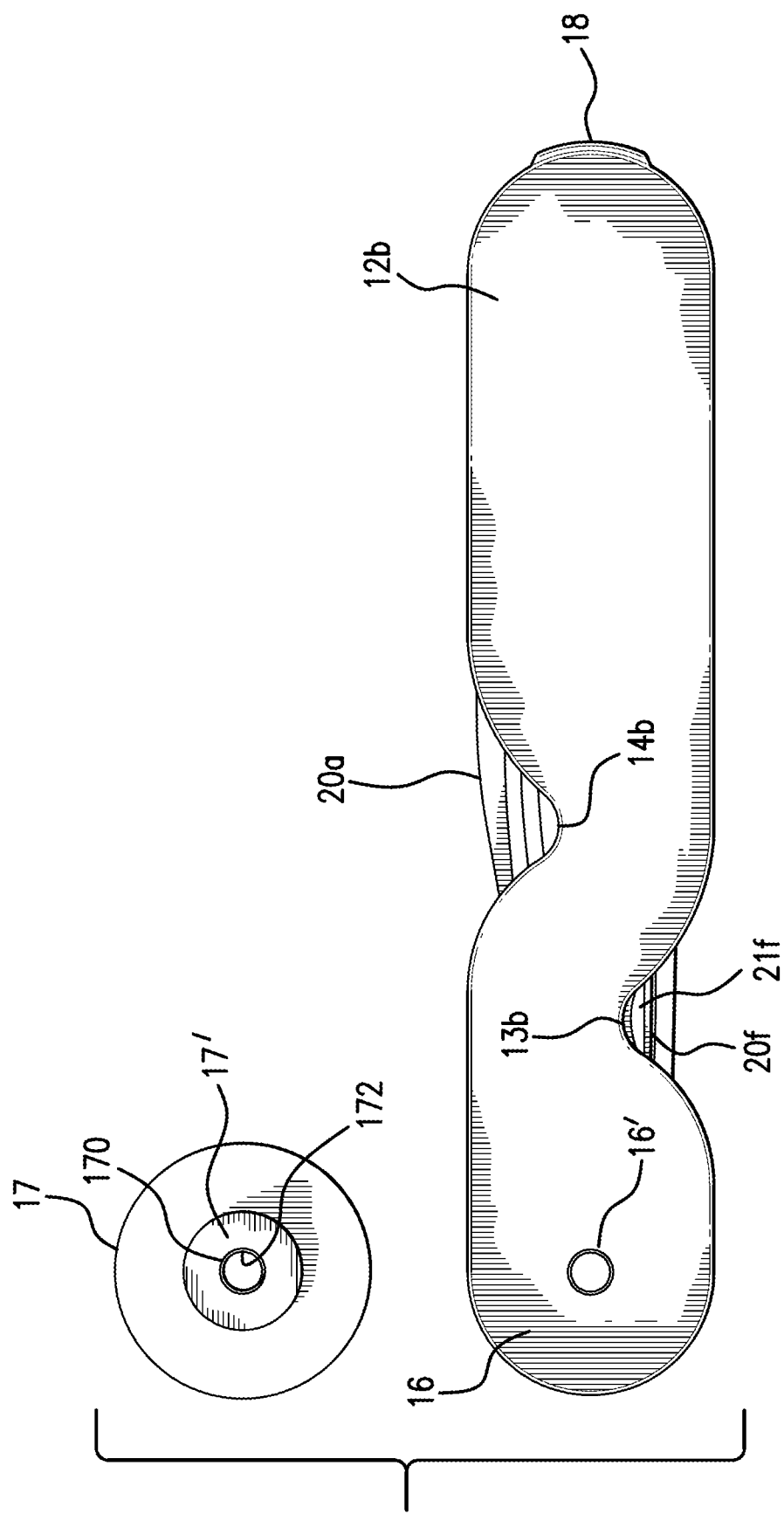
Figure 3:
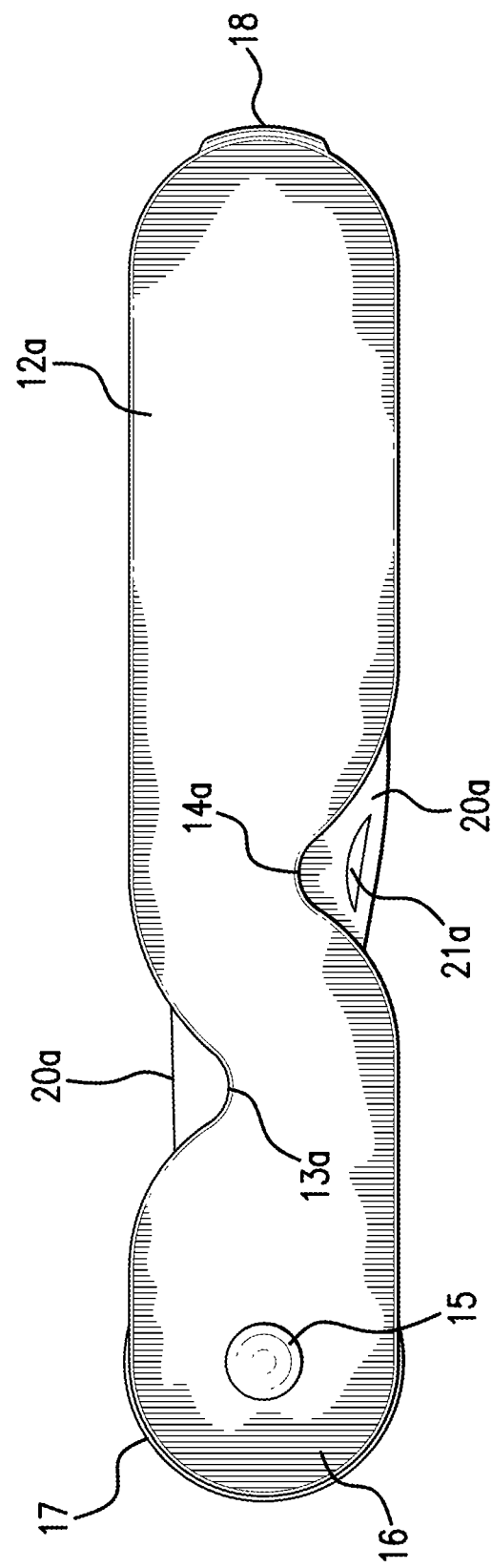
Figure 3A:
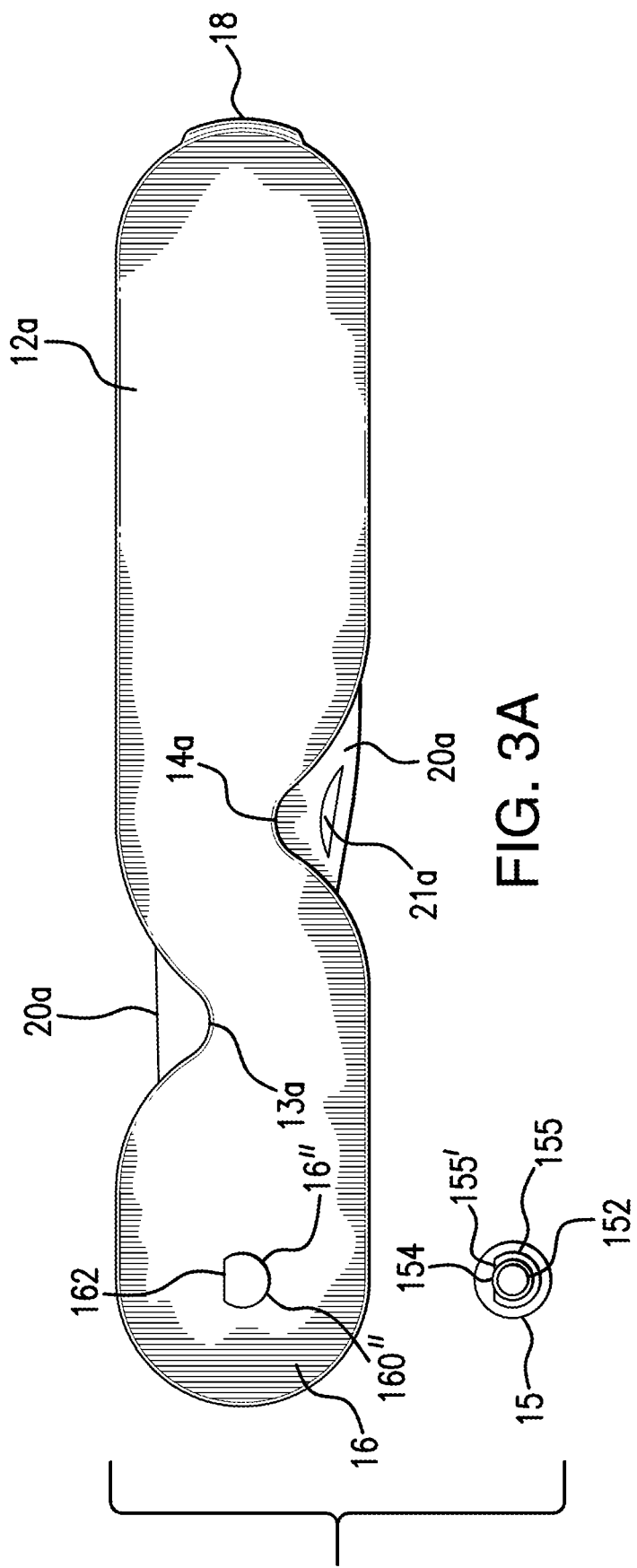

Turning more closely to FIGS. 2A, 3A, and 11A, a coupling, or pivot, point or axis is defined in this embodiment by the shaft of the coupling member 15. The shaft is formed with a threaded portion 152 which extends along at least a part of the shaft's length to its tip, or terminal end. In the embodiment shown, the shaft is preferably also formed with a keyed portion 150 extending axially between a head portion of the coupling member 15 to the threaded portion 152. The threaded portion 150 which extends to the tip of the shaft emerges from the outer side of the distal housing plate member (12b in the sample configuration shown for this embodiment) when passed through the housing and stacked blade elements for assembly. This threaded portion 152 matedly engages a threaded opening 172 of the locking member 17.

At the other end near the head portion of the coupling member 15, the shaft is passed through a keyed opening 16" formed in the end portion 16 of the proximal housing plate member (12a in the sample configuration shown for this embodiment). The coupling member 15 is generally formed in this embodiment much like a bolt, but preferably with a keyed protrusion 155 protruding axially from beneath the head portion (from which the shaft axially extends). When the coupling member 15 is fully inserted through the keyed opening 16", the keyed protrusion 155 is corresponding contoured (for example, with rounded sectional contour truncated in profile by a transverse straight edge 155' as shown) for conformed, angularly locked engagement with that keyed opening 16". This keyed engagement may be reinforced by a suitably structured and dimensioned keyed neck portion 150 of the shaft which extends axially from the keyed protrusion 155 with a corresponding sectional profile to pass through or engage a portion of the proximal housing plate's keyed opening 16" (if that plate is of sufficient thickness for the neck part 150 to remain partially disposed in the keyed opening 16"). The keyed engagement locks the coupling member 15 to the proximal housing plate member 12a against angular displacement relative thereto. For full disassembly (for cleaning or replacement of the blade members 20a-20f, for instance), the locking member 17 may be fully loosened and removed from the coupling member 15.

Thus, the locking member 17 may be screwed onto the tip of the coupling member's shaft emerging from the distal housing plate member, without extraneous measures to retain the coupling member 15 against angular displacement. The bolt head portion of the coupling member 15 then abuts and stops against the proximal housing plate member for axial retention relative to the housing 12.

Turning to FIG. 2A, this view is similar to the view shown in FIG. 2, except that the locking member 17 is shown removed from the housing 12 and turned over to fully expose its underside. In this embodiment, the locking member 17 is preferably formed with an axial protrusion 17' formed on its underside, and a central bore 170 that is preferably formed with an internally threaded surface 172. The internally threaded bore 170 is coaxially engaged by the terminal end of the coupling member 15 shaft, which is preferably formed with complementarily threaded outer surface (as illustrated in the exploded portion of the view of FIG. 11A). The axial protrusion 17' serves much as a built-in washer or spacer structure. This washer/spacer structure forms a shoulder or neck extension which limits the surface contact between the locking member 17 and the immediately opposing outer surface of the housing plate member 12b. This minimizes the frictional contact area between adjoining surfaces thereof, and makes for ease of locking and releasing rotation of the locking member 17 during use. The integral formation of the axial extension 17', moreover, facilitates convenient use in the field, as separately formed washers or spacers (which may be either flexible or rigid, and which may be suitably used in certain alternate embodiments if desired) would be prone to release and loss unless the user exercises great care not to drop them.

The locking member 17 is illustrated in this embodiment as a radial dial or wheel. The sizable structure of the adjustment wheel provided thereby offers heightened rotational leverage as well as certain aesthetic features which may be appealing for the user, and functionally enhance ease of use (for instance, easier to turn because it's a big wheel) over a smaller, less prominent structure. This is but one of numerous configurations for the locking member 17. In certain alternate embodiments, for example, the locking member 17 may be formed with various different size, shape, and/or structural configuration, depending on the particular requirements of the intended embodiment and application. Likewise, the locking member 17 may be formed of any suitable material composition known in the art (such as plastic, composite, or the like) other than the metallic (steel) material shown. As noted in preceding paragraphs, the adjustable locking member 17 may be replaced altogether with a permanent coupling/joint (formed to intercouple with or as a part of a coupling member 15 having any suitable configuration) which pre-sets the tension that the stacked blade set 20 is captured together with.

As noted, however, use of releasably joined locking and coupling members 17, 15 allows for both adjustability and convenient disassembly. Convenient disassembly may be particularly important in many settings where much dirt and debris may build up on the tool apparatus 10, and where very sticky and messy materials are regularly spread using the blades 20. For example, the tool apparatus 10 may be used with silicone, latex, urethane, or other such materials. While a user will typically clean by wiping excess material off the used blade(s) before stowing back away, over time residual buildup of dirty, gummy, or even gritty material will invariably occur. Convenient disassembly of the tool apparatus 10 permits thorough cleaning periodically—for instance by unscrewing the locking member 17, disassembling the individual blades 20a-20f from the housing 12, and dropping the disassembled components into a bath containing a suitable solvent for thorough cleaning before reassembling to keep the apparatus 10 in optimum working order and guard against premature deterioration.

The individual blade members 20a-20f in the illustrated embodiment are stacked one directly over and against the other, with no intervening component therebetween, preferably just stacked and sandwiched between the housing plate members 12a, 12b. In certain alternate embodiments and applications, suitable measures may be employed to maintain spatial separation or insert isolating partition between adjacent blade portions. This may serve, for instance, to preserve ease of displacement and/or stability of blade retention (in either the stowed or displaced positions). In addition, other tool types (such as a knife blade or some other functional implement may be interspersed with or supplemented outside the stacked blades 20 in certain alternate embodiments.

Figure 8:
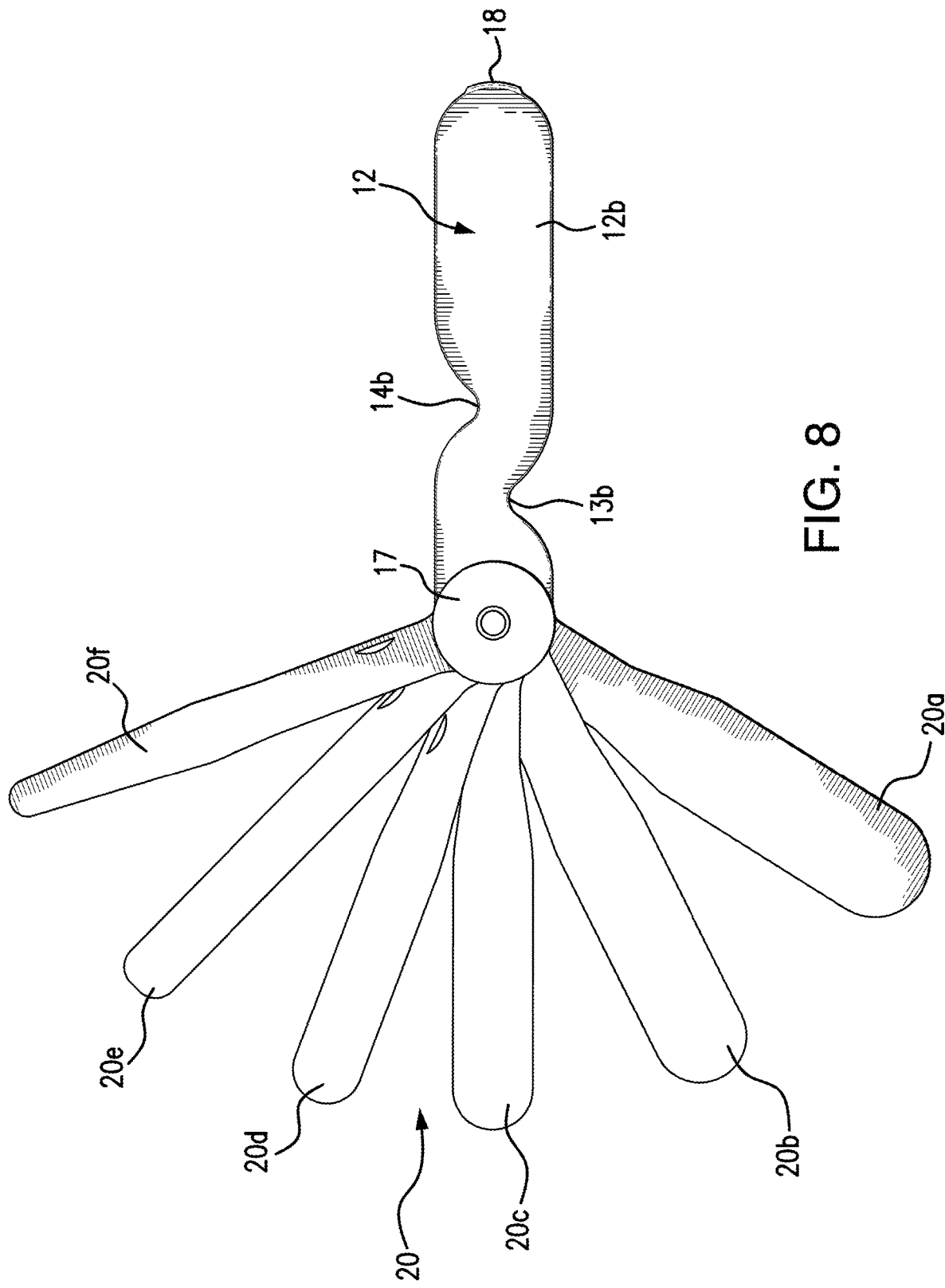
Figure 9:
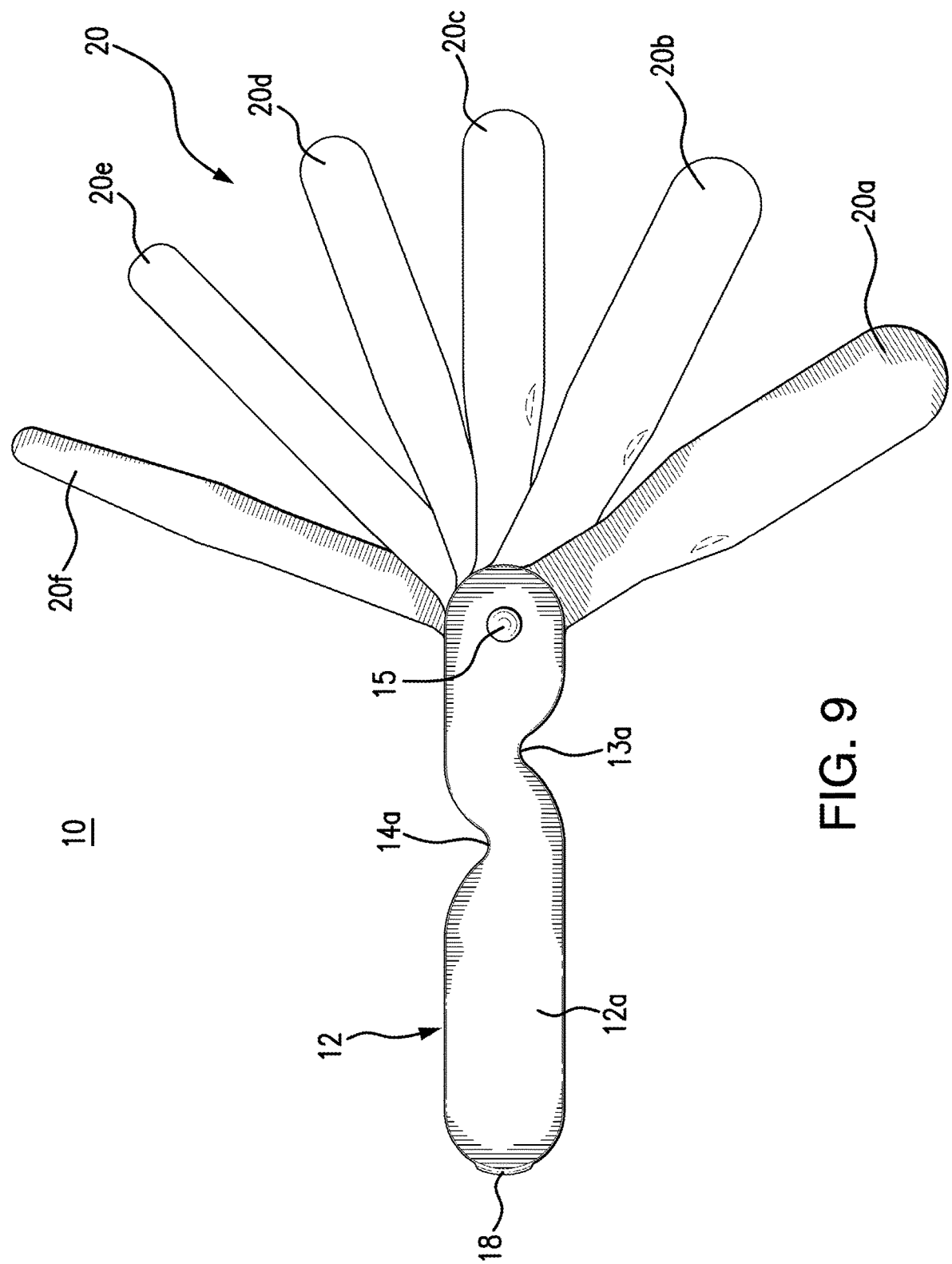

In most applications, the individual blades 20a-20f of the tool apparatus 10 are preferably deployed for use one at a time, such as illustrated in FIGS. 10-11. But FIGS. 8-9 show for illustrative purposes all of the individual blades 20a-20f at least partially deployed from the housing 12 and fanned out to demonstrate the range of blade configurations available for a user to select from.

Figure 12:
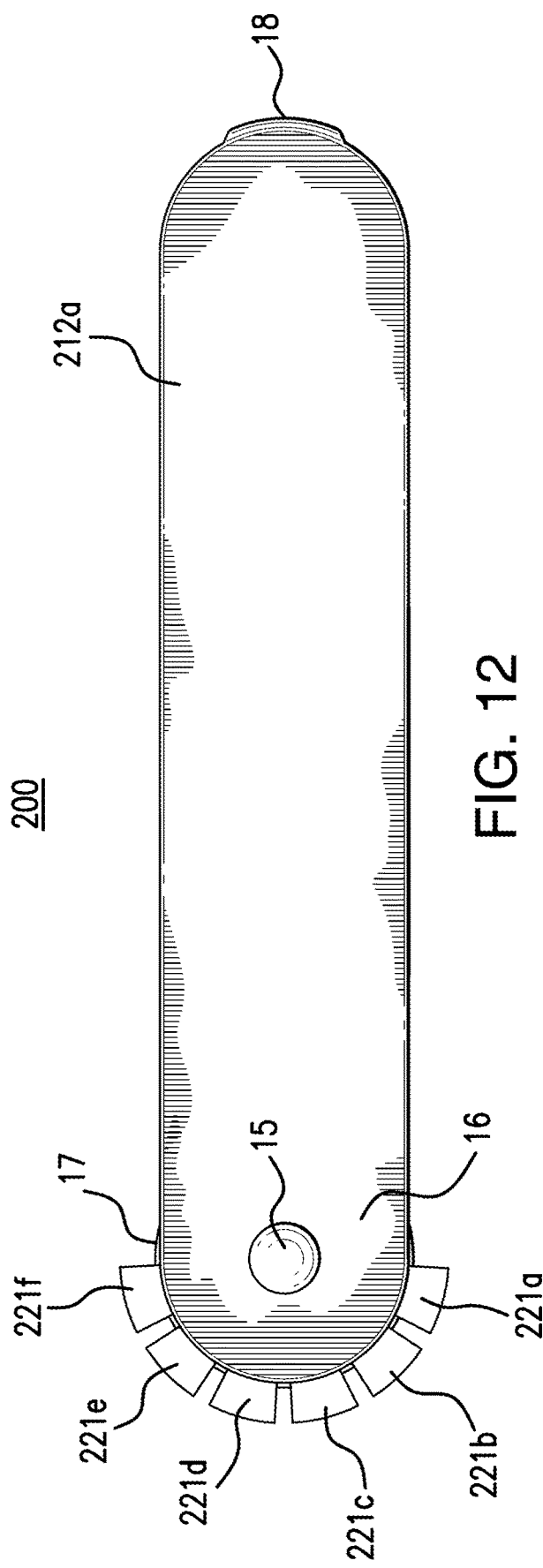
FIGS. 12-13 are top plan and rear elevational views of an apparatus formed in accordance with one exemplary alternate embodiment of the present invention.
Figure 13:
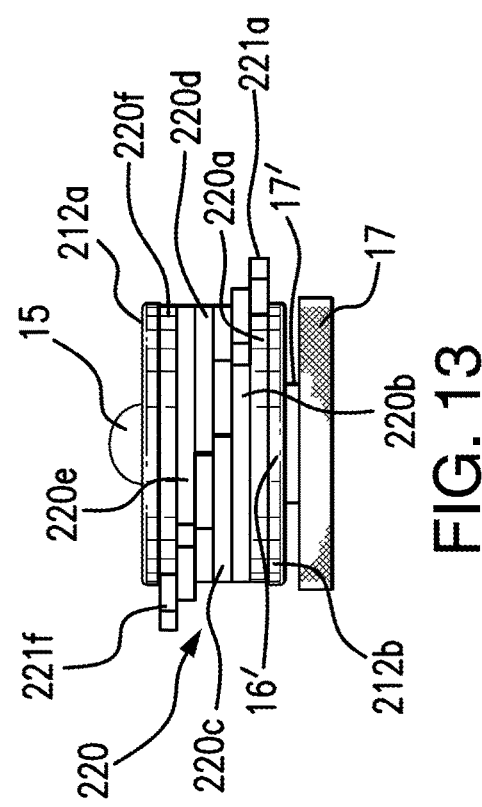

Referring now to FIGS. 12-13, there is shown one example of a combination tool apparatus 200 formed in accordance with an alternate embodiment of the present invention. In this embodiment, the housing plate members 212a, 212b are formed with a simpler peripheral contour than the housing plate members 12a, 12b in the embodiment of FIGS. 1-11A, which are peripherally contoured to define the grooved access points 13a, 13b, 14a, 14b. Manual access to the blades 220a-220f stowed within the peripheral confines of the housing is alternately provided in this embodiment by the provision of external tabs 221a-221f formed to project for convenient manual access from respective coupling ends of the blades 220a-220f. The tabs 221a-221f may be formed, for example, to extend radially from the blades' rounded coupling ends to be fanned out—at mutually displaced and distributed angular positions such as illustrated—when the stacked blade set is fully stowed between the housing plate members 212a, 212b.

When a particular blade 220a-220f is to be selected for deployment, the user may urge the blade to displace angularly out of its stowed position by pressing or pulling accordingly on its tab 221a-221f. To aid in the process, the locking member 17 may be turned to sufficiently release and loosen the captive tension on the blades, manipulate the selected blade out of the housing and into its deployed position, then re-tighten the locking member 17 for securement before making use of the tool apparatus 200. Although shown with a flat rectangular shape, the tabs 221a-221f may be of any other suitable shape and/or structural configuration in other embodiments and applications (for example, of other polygonal shape, of semi-circular shape, or the like).

Preferably, the tabs 221a-221f for the individual blades 220a-220f are sufficiently distributed in position relative to one another for ease of manually accessing each. In the fanned out distribution shown, each tab 221a-221f is angularly displaced from its immediately neighboring tabs to provide ample clearance for accurate access independent of the other blades' tabs. In this way, the tabs 221a-221f provide selectable gripping structures much like the indexing tabs of a card or folder filing system, so as to facilitate ready and convenient manipulation access to each individual blade 220a-220f. Preferably, a cover or other remedial feature known in the art may be suitably employed to minimize the potential snagging or scratching hazard that protrusive elements like the tabs 221a-221f may otherwise present. The outer profiles of the tabs 221a-221f may be rounded off, or suitably smoothed over otherwise toward that end in alternate embodiments.

Figure 14:
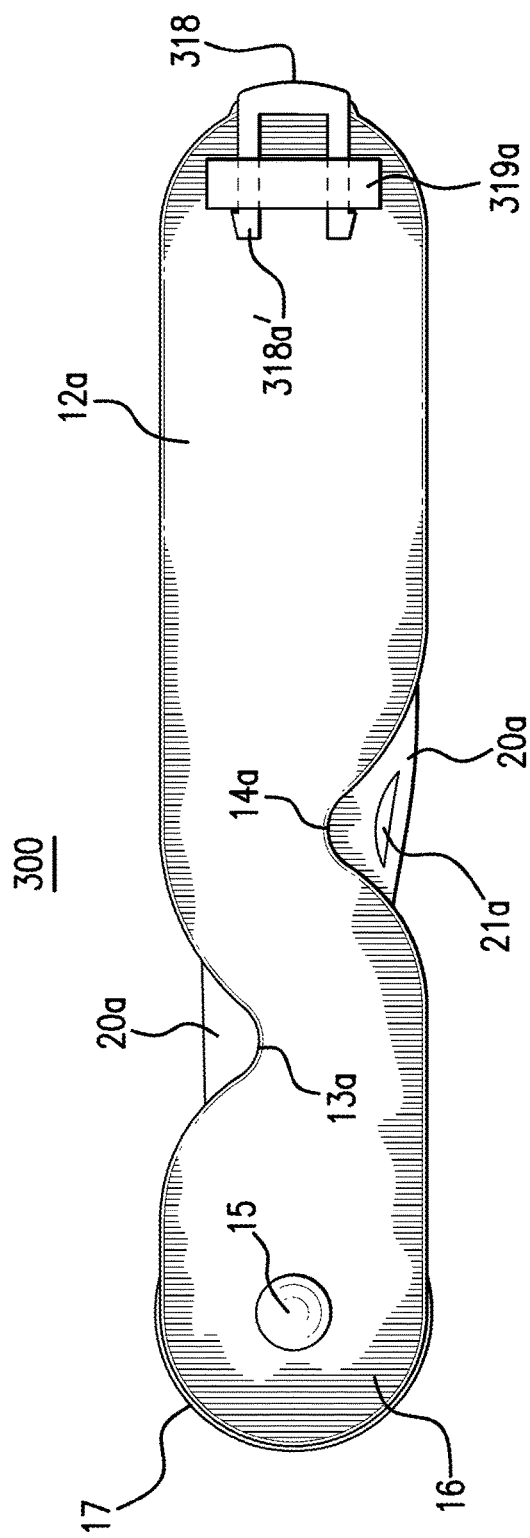
FIGS. 14-15 are top plan and side elevational views of an apparatus formed in accordance with another exemplary alternate embodiment of the present invention.
Figure 15:
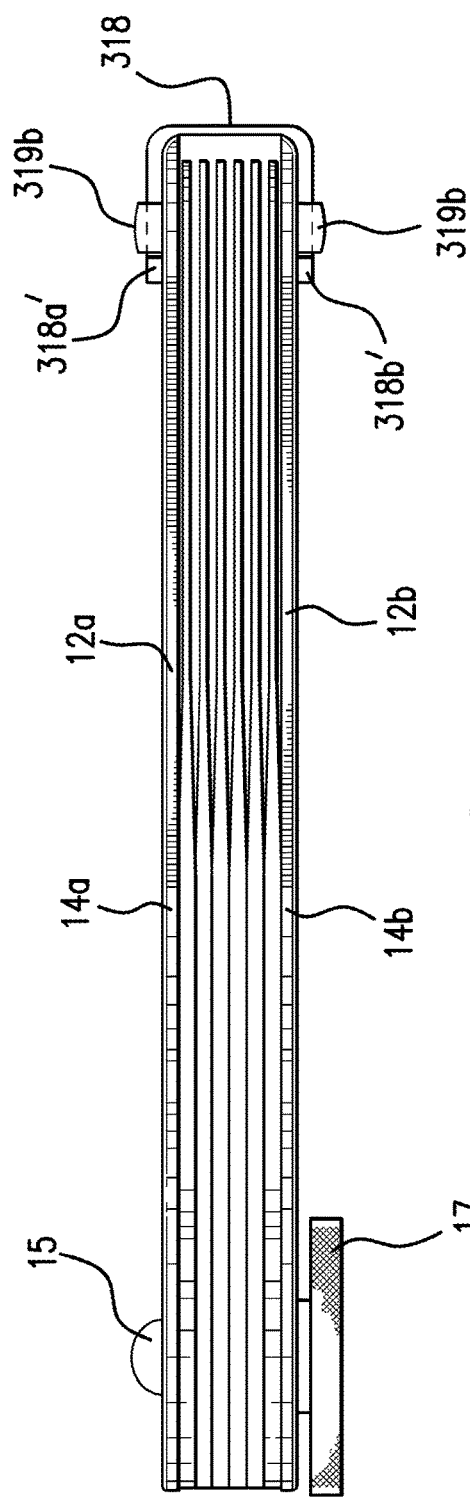

In the embodiment of FIGS. 1-11A, the housing 12 is of fixed structural configuration. More specifically, the housing 12 is of a fixed substantially U-shaped sectional contour (when sectioned along the longitudinal center lines of the opposed housing plate members). The bridge portion 18—by which the opposing housing plate members 12a, 12b are held together and spaced apart at one longitudinal end—is provided as a permanent, integrally formed extension of such housing plate members 12a, 12b in that embodiment. The blade storage chamber defined between the housing plate members 12a, 12b is therefore fixed in width. Accordingly, the space available for the stacked blade set 20 is likewise fixed. To the extent that this requires somewhat precisely coordinated manufacture of the housing with the number and individual thicknesses of the blade members to be held therein, varying the blade stack size may be difficult to accommodate. Squeezing in more or thicker blades than the housing is pre-configured for would stress that housing to the point of disturbing the alignments of the coupling member, housing plate members and blades. This would hinder proper operation of the tool apparatus and yield a potentially uneven and not very neatly finished end product.

Where the intended application so requires, the ability to accommodate different stack sizes and individual blade widths may be regulated a bit more in alternate embodiments by providing an adjustable bridging portion 18. In certain alternate embodiments, for example, this bridging portion 18 may be formed using a deflective member to allow for expansion of the blade storage chamber. One example of such alternate embodiment is shown in FIGS. 14-15, where the fixed bridging portion 18 as shown in the embodiment of FIGS. 1-11A is replaced by a removable bridging portion 318 that extends transversely between the opposed housing plate members 12a, 12b and clips respectively thereto. The housing plate members 12a, 12b are thus separable from one another, as each housing plate member terminates at a free end.

Preferably, each housing plate member 12a, 12b is equipped with an attachment bracket 319a, 319b formed at or near its free end. Each attachment bracket 319a, 319b in this embodiment preferably defines one or more engagement passages to receive clip-like tips 318a', 318b' of the removable bridging portion 318. Thus, employing a coupling member 15 of appropriate matching length, the blade storage chamber effectively formed by the housing 12 may be adjustably sized by freely adjusting the separation space between the opposed housing plate members 12a, 12b, and joining them together by a bridging portion 318 suitably dimensioned to transversely span the resultant separation space and lockingly engage the attachment brackets 319a, 319b.

Preferably, the bridging portion 318 is formed of a strong, tough, and stiff yet resilient, deflective material such as a dense rubber, plastic, or other such material of properties to permit a slight degree of flex for accommodating minor variability in a given blade set's stacked height. To the extent that a sufficient range of differently sized bridging portions are available, the need for such fine adjustability may be diminished, and a set of replaceable bridging portions 318 of different spacing size may be selectively employed to suit each given blade set. The resilience due to the material composition of the bridging portion 318, or simply due to its cantilevered, horseshoe-shaped, leaf-like configuration (which allows some flex in the mutually spaced clip arms), permits the bridging portion 318 to retentively engage yet be readily releasable from the attachment brackets 319a, 319b formed on the housing plate members 12a, 12b.

As shown, the engagement tips 318a', 318b' are illustratively configured with barb-like formations at or near their tips. These barb-like formations serve to hook, or otherwise retentively engage, corresponding engagement passages formed by the attachment brackets 319a, 319b. Where the bridging portion 318 is to be removed, the two clip arms may be squeezed towards one another to release the barbs' retentive engagement of the attachment bracket 319*a*, 319*b*, then withdrawn back out through the engagement passage(s) they had been admitted through when the bridging portion 318 was installed.

Replaceable bridging portions 318 of various other suitable structures and configurations may be employed in alternate embodiments to adjustably secure the opposed housing plate members 12*a*, 12*b* together in mutually spaced arrangement, so as to accommodate the number and overall thickness of the individual blades employed in the desired blade set. As needed for a given embodiment and application, a bridging portion 318 of a certain default size and configuration may be provided with the combination tool apparatus 300, along with a plurality of interchangeable retaining portions 318 of different size and/or configuration selectively deployed for use as needed in the field.

Preferably, an accessory hole 18' is formed in or through the bridging portion 18, 318. Such an accessory hole 18' may be used to connect a handy tie or strap, such as a lanyard for example, to aid in securing the tool 10, 200, 300 to the user's person, or to a toolbox, or other securement point.

Although this invention has been described in connection with specific forms and embodiments thereof, it will be appreciated that various modifications other than those discussed above may be resorted to without departing from the spirit or scope of the invention as defined herein. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined herein.

What is claimed is:

1. A combination tool apparatus for selectively stowing and deploying a plurality of variously configured implements for spreading materials, the apparatus comprising:
   a housing defining a coupling end portion and including first and second plate members extending longitudinally from said coupling end portion to define a stowage compartment therebetween;
   a blade set including a plurality of blade members each defining a spreading portion, said spreading portions of different blade members being variously configured relative to one another, each of said blade members being angularly displaceable between stowed and deployed positions with respect to said housing, each said blade member in the stowed position being disposed substantially within the stowage compartment of said housing and in the deployed position having at least a portion thereof extending outward from the stowage compartment; and,
   a coupling member disposed at said coupling end portion of said housing to pivotally couple said blade members for angular displacement thereabout between the stowed and deployed positions, wherein said blade members are biased to remain in the stowed position;
   wherein said coupling member is removably passed through said first and second housing plate members and said blade set disposed therebetween, said coupling member including a head portion engaging said first housing plate member and a pivot shaft extending axially beyond said second housing plate member;
   wherein a locking member releasably engages a terminal end of said pivot shaft to capture the blade set between said first and second housing plate members in adjustable force fit manner.

2. The combination tool apparatus as recited in claim 1, wherein said first and second plate members extend longitudinally from said coupling end portion to a bridging end portion, said first and second plate members being coupled together by a bridge member extending transversely to span the stowage compartment therebetween.

3. The combination tool apparatus as recited in claim 2, wherein said bridge member is integrally formed to extend transversely between said first and second housing plate members at said bridging end portion of said housing.

4. The combination tool apparatus as recited in claim 2, wherein said bridge member is detachably coupled to join said first and second housing plate members at said bridging end portion of said housing.

5. The combination tool apparatus as recited in claim 2, wherein said bridge member includes a resilient portion for deflectively clipped engagement with said first and second housing plate members.

6. The combination tool apparatus as recited in claim 1, wherein said coupling member engages said coupling end portion of said housing to pivotally intercouple said blade members, wherein:
   said first housing plate member is formed with a keyed opening at said coupling end portion;
   said coupling member including a keyed protrusion adjacent to said head portion, said pivot shaft extending axially from said keyed protrusion, said keyed protrusion engaging the keyed opening to lock said coupling member against angular displacement relative to said first housing plate member; and,
   said coupling member including a threaded portion extending along at least a part of said pivot shaft to the terminal end thereof.

7. The combination tool apparatus as recited in claim 1, wherein each of said housing plate members defines at least first and second access points each contoured for open access to a portion of at least one of said blade members when in the stowed position within said stowage chamber of said housing.

8. The combination tool apparatus as recited in claim 1, wherein each of said blade members is formed with a gripping feature disposed thereon to align with at least one of said first and second access points of said first and second housing plate members for gripping access by a user when said blade member is disposed in the stowed position within said stowage chamber of said housing.

9. The combination tool apparatus as recited in claim 1, wherein said locking member includes a wheel portion and an axial protrusion coaxially therefrom, said axial protrusion being lesser in diametric extent than said wheel portion, said axial protrusion being forming an internally threaded bore 170 for coaxial engagement by the terminal end of said pivot shaft of said coupling member, said axial protrusion spacing said wheel portion away from direct engagement of said second housing plate member when said coupling member is installed thereon.

10. The combination tool apparatus as recited in claim 1, wherein said blade members of said blade set are independently displaceable between the stowed and deployed positions thereof, and said blade members are progressively varied in width and flexibility of respective spreading portions thereof.

11. A combination tool apparatus for selectively stowing and deploying a plurality of variously configured implements for spreading materials, the apparatus comprising:
   a housing defining a coupling end portion and including first and second plate members extending longitudinally from said coupling end portion to define a stowage compartment therebetween;

a blade set including a plurality of blade members each defining a spreading portion, said spreading portions of different blade members being variously configured relative to one another, each of said blade members being angularly displaceable between stowed and deployed positions with respect to said housing, each said blade member in the stowed position being disposed substantially within the stowage compartment of said housing and in the deployed position having at least a portion thereof extending outward from the stowage compartment; and, a coupling member disposed at said coupling end portion of said housing to pivotally couple said blade members for angular displacement thereabout between the stowed and deployed positions, wherein said blade members are biased to remain in the stowed position;

wherein each of said blade members is formed with at least one external tab projecting therefrom peripherally beyond said housing when in the stowed position within said stowage compartment.

12. The combination tool apparatus as recited in claim 11, wherein said coupling member is removably passed through said first and second housing plate members and said blade set disposed therebetween, said coupling member including a head portion engaging said first housing plate member and a pivot shaft extending axially beyond said second housing plate member.

13. The combination tool apparatus as recited in claim 12, further comprising a locking member releasably engaging a terminal end of said pivot shaft to capture the blade set between said first and second housing plate members in adjustable force fit manner.

14. The combination tool apparatus as recited in claim 11, wherein the external tabs of said blade members extend radially outward from said housing when said blade members are disposed in the stowed position, with said external tabs distributed to be offset from one another in angular position about said coupling end portion of said housing when said blade members are disposed in the stowed position.

15. A combination tool apparatus for selectively stowing and deploying a plurality of variously configured implements for spreading materials, the apparatus comprising:

a housing defining a coupling end portion and a bridging end portion, said housing including first and second plate members extending longitudinally between said coupling end and bridging end portions to define a stowage compartment therebetween, said first and second plate members being coupled together by a bridge member extending transversely across the stowage compartment at said bridging end portion;

a blade set including a plurality of blade members each defining a spreading portion, said spreading portions of different blade members being variously configured relative to one another, each of said blade members being angularly displaceable between stowed and deployed positions with respect to said housing, each said blade member in the stowed position being disposed substantially within the stowage compartment of said housing and in the deployed position having at least a portion thereof extending outward from the stowage compartment;

a coupling member releasably engaging said coupling end portion of said housing to pivotally couple said blade members for angular displacement thereabout between the stowed and deployed positions, said coupling member including a head portion engaging said first housing plate member and a pivot shaft extending axially through said blade members and beyond said second housing plate member; and, a locking member releasably engaging a terminal end of said pivot shaft to capture the blade set between said first and second housing plate members in adjustable force fit manner;

wherein:
said first housing plate member is formed with a keyed opening at said coupling end portion;

said coupling member includes a keyed protrusion adjacent to said head portion, said pivot shaft extending axially from said keyed protrusion, said keyed protrusion engaging the keyed opening to lock said coupling member against angular displacement relative to said first housing plate member; and, said coupling member includes a threaded portion extending along at least a part of said pivot shaft to the terminal end thereof; and, said blade members are frictionally biased to remain in the stowed position.

16. The combination tool apparatus as recited in claim 15, wherein said bridge member is detachably coupled to join said first and second housing plate members at said bridging end portion of said housing.

17. The combination tool apparatus as recited in claim 15, wherein:
each of said blade members is formed with at least one external tab projecting radially outward therefrom peripherally beyond said housing when in the stowed position within said stowage compartment; and, said external tabs are distributed to be offset from one another in angular position about said coupling end portion of said housing when said blade members are disposed in the stowed position.

18. A combination tool apparatus for selectively stowing and deploying a plurality of variously configured implements for spreading materials, the apparatus comprising:

a housing defining a coupling end portion and a bridging end portion, said housing including first and second plate members extending longitudinally between said coupling end and bridging end portions to define a stowage compartment therebetween, said first and second plate members being coupled together by a bridge member extending transversely across the stowage compartment at said bridging end portion, each of said housing plate members defining at least first and second access points each having a grooved contour to maintain open access to a portion of at least one of said blade members when in the stowed position within said stowage chamber;

a blade set including a plurality of blade members each defining a spreading portion, said spreading portions of different blade members being variously configured relative to one another, wherein:

each of said blade members is angularly displaceable between stowed and deployed positions with respect to said housing, each said blade member in the stowed position being disposed substantially within the stowage compartment of said housing and in the deployed position having at least a portion thereof extending outward from the stowage compartment; and, each of said blade members is formed with a gripping feature disposed thereon to align with at least one of said first and second access points of said first and second housing plate members for gripping access by a user when said blade member is disposed in the stowed position within said stowage chamber of said housing; and, a coupling member disposed at said coupling end portion of said housing to pivotally couple said blade members for angular displacement thereabout between the stowed and deployed positions, wherein said blade members are biased to remain in the stowed position.

19. The combination tool apparatus as recited in claim 18, wherein said coupling member is removably passed through said first and second housing plate members and said blade set disposed therebetween, and a locking member releasably engages a terminal end of said pivot shaft to capture the blade set between said first and second housing plate members in adjustable force fit manner, wherein:

said coupling member includes a head portion engaging said first housing plate member and a pivot shaft extending axially beyond said second housing plate member; and, said locking member includes a wheel portion and an axial protrusion coaxially therefrom, said axial protrusion being lesser in diametric extent than said wheel portion, said axial protrusion being forming an internally threaded bore for coaxial engagement by the terminal end of said pivot shaft of said coupling member, said axial protrusion spacing said wheel portion away from direct engagement of said second housing plate member when said coupling member is installed thereon.

20. A combination tool apparatus for selectively stowing and deploying a plurality of variously configured implements for spreading materials, the apparatus comprising:

a housing defining a coupling end portion and including first and second plate members extending longitudinally from said coupling end portion to define a stowage compartment therebetween;

a blade set including a plurality of blade members each defining a spreading portion, said spreading portions of different blade members being variously configured relative to one another, each of said blade members being angularly displaceable between stowed and deployed positions with respect to said housing, each said blade member in the stowed position being disposed substantially within the stowage compartment of said housing and in the deployed position having at least a portion thereof extending outward from the stowage compartment; and, a coupling member disposed at said coupling end portion of said housing to pivotally couple said blade members for angular displacement thereabout between the stowed and deployed positions, wherein said blade members are biased to remain in the stowed position;

wherein each of said housing plate members defines at least first and second access points each contoured for open access to a portion of at least one of said blade members when in the stowed position within said stowage chamber of said housing;

wherein each of said blade members is formed with a gripping feature disposed thereon to align with at least one of said first and second access points of said first and second housing plate members for gripping access by a user when said blade member is disposed in the stowed position within said stowage chamber of said housing.

* * * * *